March 30, 1948. K. M. ARMANTROUT 2,438,691
TRANSMISSION CONTROL MECHANISM
Filed Sept. 11, 1944   2 Sheets-Sheet 1
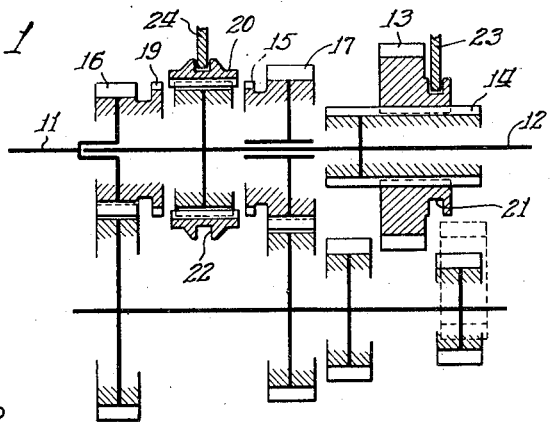
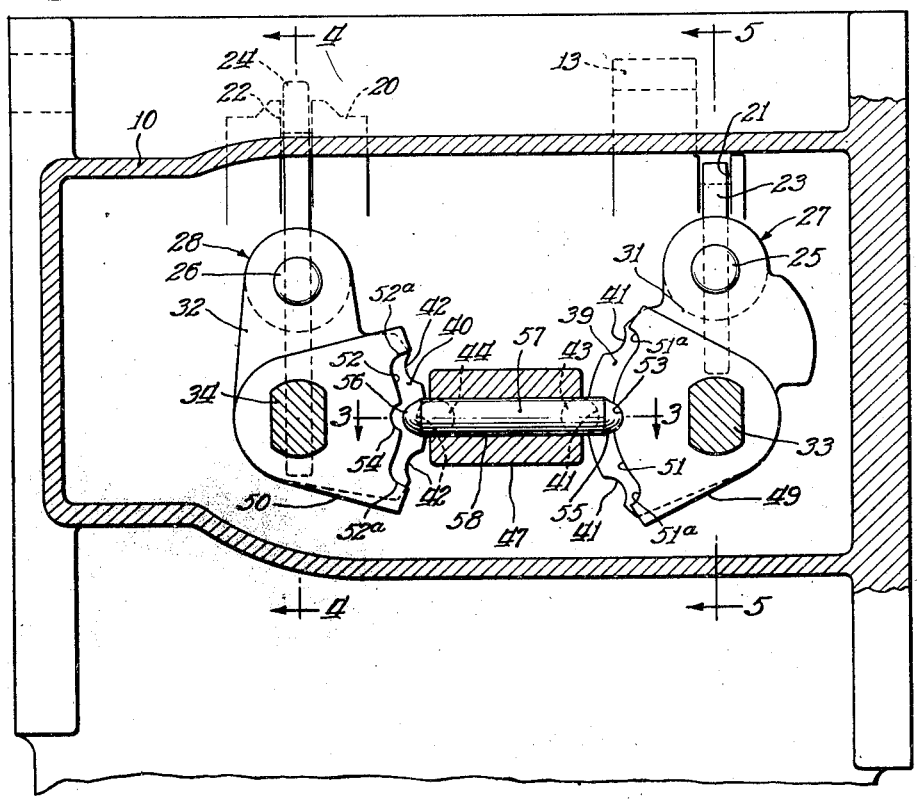
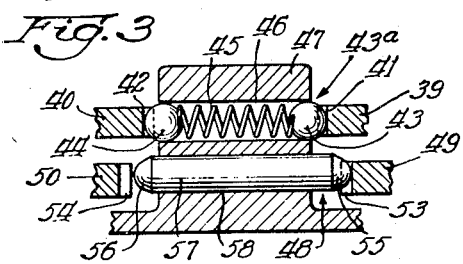
Inventor:
Kenneth M. Armantrout March 30, 1948.　　K. M. ARMANTROUT　　2,438,691
TRANSMISSION CONTROL MECHANISM
Filed Sept. 11, 1944　　2 Sheets-Sheet 2
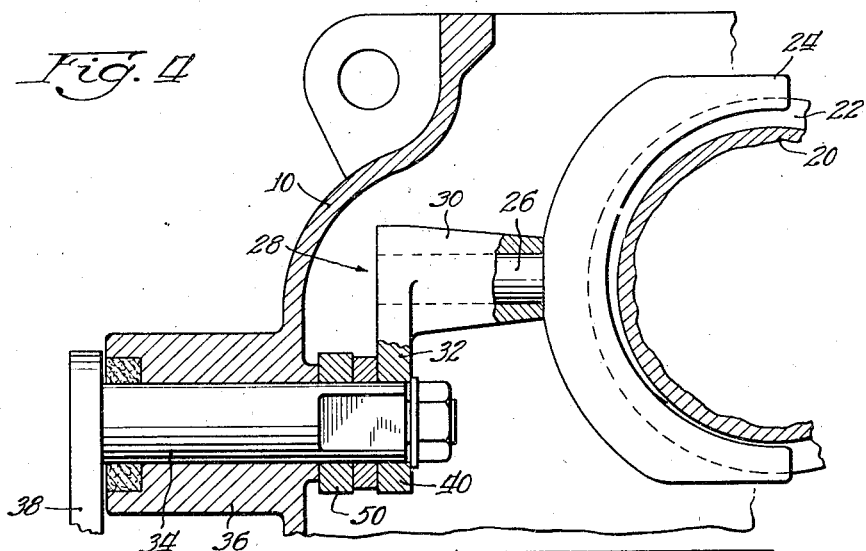
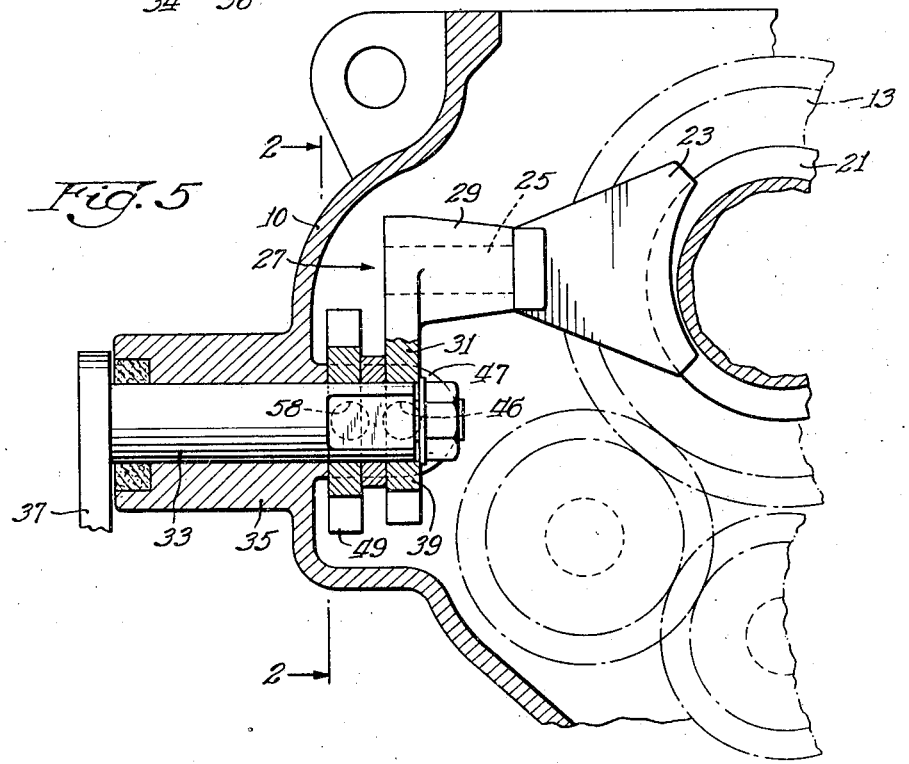
Inventor:
Kenneth M. Armantrout Patented Mar. 30, 1948

2,438,691

UNITED STATES PATENT OFFICE 2,438,691

TRANSMISSION CONTROL MECHANISM

Kenneth M. Armantrout, Muncie, Ind., assignor to Borg-Warner Corporation, Chicago, Ill., a corporation of Illinois Application September 11, 1944, Serial No. 553,504

7 Claims. (Cl. 74—477)

1

This invention relates to speed transmissions of the shiftable type usually employed in motor vehicles, and it has particular relation to an assembly of the character mentioned that is controlled by a lever on or adjacent the steering column of the vehicle.

Transmissions of this character contemplate employment of a pair of cranks suitably journaled in the gear housing. The outer portions of these cranks have levers that are suitably linked to the manual control or shift lever, and within the housing these cranks carry forks for slidingly shifting certain members of the torque transmission assembly. It is customary to provide an interlock device for the purpose of rendering one crank active and the other crank inactive depending upon the shift of the manual control lever.

It is the primary purpose of the present invention to simplify the construction of a transmission control or interlock such as contemplated herein and to improve the efficiency, operation and dependability of such control or interlock.

Another principal object of this improvement is to provide indexing and interlock means that are positioned between and for coaction with the rock shafts or cranks that operate the shiftable members of the transmission assembly.

Also one of the principal objects hereof is to provide an interlock device that will effectively prevent the simultaneous operation of both cranks and at the same time is also adapted to releasably retain each crank in any of its selected positions.

It is also an object hereof to provide a transmission interlock assembly wherein the cranks are provided with peripherally notched sectors arranged in confronting edgewise relation to each other for coaction with a yieldable double-ended poppet device that is aligned with such sectors. This interlock assembly also includes other peripherally notched sectors arranged in confronting edgewise relation to each other, preferably on the rock shafts or cranks, alongside the respective first named sectors for coaction with a non-yielding slidable interlock bar. In this arrangement the axes of the poppet device and the sliding bar are disposed close to and in parallel relation to each other, and the interlock sectors have elongated recesses in their peripheries wherein the notches are located for engagement by the interlock bar. The ends of these elongated recesses thus constitute shoulders or abutments against which the ends of the interlock bar are adapted to engage for limiting rotational movement of the cranks in both directions.

Additional objects, aims and advantages of the improvement contemplated herein will be apparent to persons skilled in the art after understanding the transmission control from the within description.

It is preferred to accomplish the numerous objects of this invention and to practice same in substantially the manner hereinafter fully described and as more particularly pointed out in the appended claims. Reference is now made to the accompanying drawings which form a part of this specification, wherein:

Fig. 1 is a sectional diagrammatic view of a transmission assembly to which the present control devices are applicable;

Fig. 2 is a sectional view, taken along the plane of line 2—2 on Fig. 5, showing the control device in elevation;

Fig. 3 is an axial section of the poppet device and interlock bar, the view taken on line 3—3 of Fig. 2;

Fig. 4 is a transverse sectional view taken along the plane of line 4—4 on Fig. 2; and Fig. 5 is a transverse sectional view taken along the plane of line 5—5 on Fig. 2.

The drawings are to be understood as being more or less of a schematic character for the purpose of disclosing a typical or preferred form of the improvements contemplated herein. In the drawings like reference characters identify the same parts in the different views.

The motor vehicle transmission shown in Figs. 1 and 2 preferably comprises a housing 10 for receiving and journaling the drive shaft 11 and the driven shaft 12 that are disposed with their axes in alignment. Driven shaft 12 carries a combined low and reverse gear 13 connected to it by splines 14 and there is an intermediate clutch element 15 that is rotated on driven shaft 12 through suitable reduction gearing including gears 16 and 17 attached respectively to said drive shaft 11 and clutch element 15. There is a direct drive clutch member 19 on the drive shaft 11 and a shiftable positive jaw clutch sleeve 20 is adapted to transfer the drive from the second speed clutch element 15 or the direct drive clutch member 19 to the driven shaft 12 to which the positive clutch sleeve 20 is drivingly connected. The gear 13 is provided with a channel 21 preferably in its hub, and the clutch sleeve 20 has an annular channel 22. These channels 21 and 22 are respectively engaged by shift forks 23 and 24.

The shanks or trunnions 25 and 26 of the respective shift forks 23 and 24 are rotatably mounted on cam members 27 and 28 that comprise hollow bosses 29 and 30 for journaling shanks 25 and 26, said bosses projecting from the sides of crank arms or cam members 31 and 32 that are anchored to a pair of parallel rock shafts 33 and 34 that are journaled in bearing bosses 35 and 36 on the adjacent portion of the housing 10 as shown in Figs. 4 and 5. These rock shafts 33 and 34 project out of housing 10 through their bearing bosses 35 and 36 and their outer ends have actuating levers 37 and 38 anchored to them, which levers are connected by suitable linkage (not shown) to the control mechanism on the steering post.

The crank arms or cam elements 31 and 32 have sectors 39 and 40 preferably formed integrally with them, the sectors being arranged in alignment with each other so that their peripheries are in confronting relation. The arcuate periphery of sector 39 has a plurality of spaced notches 41 and similarly the sector 40 is provided with spaced peripheral notches 42. These notches 41 and 42 are adapted to cooperate with a yieldable positioning or indexing poppet device 43a comprising balls 43 and 44 arranged in the outer ends of a bore 46 of a boss 47 that projects inward from the housing into the space between the notched peripheries of sectors 39 and 40 as shown in Figs. 2 and 3. The balls are urged outward by a coiled spring 45 in the bore 46 so that they are adapted to be seated in peripheral notches 41 and 42 to yieldably hold the cranks in their various selected positions. Thus a single poppet device 43a is operable with relation to the notched peripheries of both sectors to effect the indexing of the cranks. The poppet device together with the notched sectors 39 and 40 constitute a dependable and compact indexing assembly for the shiftable members of the transmission and it is conveniently located between the rock shafts.

The interlock assembly 48 comprises sectors 49 and 50 anchored to the rock shafts 33 and 34 between the bearings and the cam elements 31 and 32 as shown in Figs. 3, 4, and 5. These sectors 49 and 50 have elongated peripheral recesses 51 and 52 respectively, the end walls of which provide stops or abutments 51a and 52a for limiting rotative movement of said sectors as well as the respective rock shafts and cam members. Approximately midway between abutments 51a and 52a the recesses have notches 53 and 54 for cooperation with the rounded or hemispherical ends 55 and 56 of a rigid interlock element 57 having slidable movement in a bore 58 in the boss 47 alongside and parallel with the bore 46 in which the poppet device 43a is mounted. The sliding interlock element 57 is long enough so that both ends 55 and 56 project into and are constantly operative in the elongated recesses 51 and 52 of sectors 49 and 50. When rock shaft 34 is rotated the movement of sector 50 will force the interlock bar 57 out of notch 54 of said sector so that its end 56 will ride on the smooth surface of the elongated recess 52. This will seat the other end 55 in the peripheral notch 53 of the opposite sector 49 and lock the rock shaft 33 against rotative movement. Rotation of rock shaft 34 may be continued until indexed by the poppet device 43a at which time the end 56 of the interlock bar has engaged an abutment 52a at the end of the recess 52. When rock shaft 34 has been rotated back to its neutral position it will be indexed by the poppet device 43a so that the peripheral notch 54 of sector 50 will be opposite the end 56 of interlock bar 57. The other rock shaft 33 may then be rotated to slide the bar into locking relation with the peripheral notch 54 of sector 50. It is apparent that this interlock element cooperates with the sectors 49 and 50 for the dual purpose of preventing simultaneous shifting of both cranks, and also limits rotative movement of the two shifting cranks or rock shafts for the transmission gearing.

While this invention has been described in detail in its present preferred form or embodiment, it will be apparent to persons skilled in the art, after understanding the improvements, that various changes and modifications may be made therein without departing from the spirit or scope thereof. It is aimed in the appended claims to cover all such changes and modifications.

I claim:

1. In combination with a transmission assembly having a plurality of shiftable torque transmitting members, and separate cam elements carried by spaced rock shafts for shifting said members, the improvement comprising peripherally notched indexing sectors on said shafts in confronting edge relation to each other; peripherally notched interlock sectors on said shafts arranged in confronting edge relation to each other; an indexing poppet device between said shafts cooperating with the notched peripheries of said indexing sectors; and an interlock device between said shafts cooperating with the notched peripheries of said interlock sectors.

2. In combination with a transmission assembly having a plurality of shiftable torque transmitting members, and separate cam elements for shifting said members, the improvement comprising a first pair of sectors arranged in edgewise facing alignment with respect to each other, each sector connected to a respective cam element and having notches in its periphery confronting the other sector; a poppet device intermediate the peripheries of said sectors for engagement in opposing notches on the respective sectors; and an interlock device comprising a second pair of sectors each connected to a respective cam element alongside a first sector, said second sectors having notched peripheries; and a rigid interlock member having sliding movement on a fixed axis alongside said poppet device for engagement in the peripheral notch of one of said sectors at a time to prevent movement of said one of said second sectors and its associated cam while permitting movement of the other sector of said second pair of sectors and its associated cam.

3. In combination with a transmission assembly having a plurality of shiftable torque transmission members and separate cam elements for shifting said members, the improvement comprising a first pair of sectors arranged in edgewise facing alignment with respect to each other, each sector connected to a respective cam element and having notches in its periphery confronting the other sector; a support between the peripheries of said sectors; a poppet device mounted in a bore in said support for engagement in opposing notches on the respective sectors; and an interlock device comprising a second pair of sectors connected to the respective cam elements alongside said first sectors, said second sectors having notched peripheries; and a rigid interlock member arranged for sliding movement in a bore in said support alongside said poppet device in alignment with said second sectors for engagement in the peripheral notch of one of said second sectors at a time to permit movement of one pair of side-by-side first and second sectors and to prevent movement of the other pair of side-by-side sectors.

4. In combination with a transmission assembly having a plurality of shiftable torque transmission members, and separate cam elements for shifting said members, the improvement comprising a first pair of sectors arranged in edgewise facing alignment with respect to each other, each sector being connected to a respective cam element and having a notched periphery confronting the other sector; a poppet device intermediate the peripheries of said sectors for engagement in opposing notches on the respective sectors; and an interlock device comprising a second pair of sectors connected to the respective cam elements alongside said first sectors, said second sectors having circumferentially elongated peripheral recesses providing spaced shoulder means; notches in the mid-portions of said recesses; and a rigid interlock member arranged for sliding movement on a fixed axis alongside said poppet device in alignment with said second sectors, the ends of said interlock member being constantly positioned in the peripheral recesses of said second sectors to engage the shouldered ends of said recesses for limiting movement of said cam elements, said interlock member being adapted for engagement in the peripheral notch of one of said second sectors at a time to permit movement of one cam element and to arrest movement of another cam element.

5. In combination with a transmission assembly having a plurality of shiftable torque transmission members, and separate cam elements for shifting said members, the improvement comprising a first pair of sectors arranged in edgewise facing alignment with respect to each other, each sector connected to a respective cam element and having a notched periphery confronting the other sector; a support between the peripheries of said sectors; a double ended poppet device mounted in a bore in said support for engagement in opposing notches on the respective sectors; and an interlock device comprising a second pair of sectors connected to the respective cam elements alongside said first sectors, said second sectors having peripheral recesses providing spaced shoulder means; notches in the mid-portions of said recesses; and a rigid interlock member arranged for sliding movement in a bore in said support parallel to said poppet device and aligned with said second sectors, the ends of said interlock member being constantly positioned in the peripheral recesses of said second sectors to engage the shouldered ends of said recesses for limiting movement of said cam elements, said interlock member being adapted for engagement in the peripheral notch of one of said second sectors at a time to permit movement of one cam element and to arrest movement of the other cam element.

6. In combination with a transmission having a plurality of shiftable torque transmission members and cranks for shifting said members carried by spaced rock shafts to form assemblies with the cranks, spring poppet means between said shafts and cooperating with the shafts for yieldably indexing the shafts in a plurality of different rotative positions, an interlock mechanism between said shafts and spaced from said poppet means and including means forming a rigid bar having sliding movement on a fixed axis alongside and spaced from said poppet means and adapted to enter into notches provided in peripheral portions of each of said crank-shaft assemblies.

7. In combination with a transmission having a plurality of shiftable torque transmission members and cranks for shifting said members carried by spaced rock shafts to form assemblies with the cranks, spring poppet means between said shafts for yieldably indexing the shafts in a plurality of different rotative positions including a pair of members having a spring disposed therebetween and being pressed thereby into notches provided in peripheral portions of each of said crank-shaft assemblies, an interlock mechanism between said shafts and spaced from said poppet means and including a rigid bar having sliding movement on a fixed axis alongside of and spaced from said poppet means and adapted to enter into notches provided in peripheral portions of each of said crank-shaft assemblies.

KENNETH M. ARMANTROUT.

REFERENCES CITED

The following references are of record in the file of this patent:

UNITED STATES PATENTS

| Number | Name | Date |
| --- | --- | --- |
| 1,850,302 | Hoelscher | Mar. 22, 1932 |
| 2,153,085 | Herndon | Apr. 4, 1939 |
| 2,299,889 | Fishburn | Oct. 27, 1942 |
| 2,317,761 | Haigh | Apr. 27, 1943 |
| 2,366,655 | Russey | Jan. 2, 1945 |